(12) United States Patent
Yoshizawa et al.

(10) Patent No.: US 8,963,968 B2
(45) Date of Patent: Feb. 24, 2015

(54) IMAGE PROCESSING APPARATUS AND IMAGE PROCESSING METHOD TO PERFORM SCREEN PROCESS ON IMAGE DATA OF A PLURALITY OF COLORS USING THRESHOLD MATRIX FOR EACH COLOR

(71) Applicant: Konica Minolta, Inc., Tokyo (JP)

(72) Inventors: Masanori Yoshizawa, Hino (JP); Toshiyuki Mizutani, Hino (JP)

(73) Assignee: Konica Minolta, Inc., Tokyo (JP)

( * ) Notice: Subject to any disclaimer, the term of this patent is extended or adjusted under 35 U.S.C. 154(b) by 116 days.

(21) Appl. No.: 13/862,576

(22) Filed: Apr. 15, 2013

(65) Prior Publication Data

US 2013/0285992 A1 Oct. 31, 2013

(30) Foreign Application Priority Data

Apr. 27, 2012 (JP) ................................ 2012-102293

(51) Int. Cl.
*G09G 5/02* (2006.01)
*G09G 3/20* (2006.01)
*H04N 1/52* (2006.01)
*H04N 1/405* (2006.01)

(52) U.S. Cl.
CPC .. *G09G 3/20* (2013.01); *H04N 1/52* (2013.01); *H04N 1/4053* (2013.01)
USPC .............. 345/696; 345/694; 345/690; 345/89

(58) Field of Classification Search
CPC ....... G09G 3/2044–3/2066; G09G 2320/0261; G09G 3/0285
USPC .................... 345/694–696, 690, 89
See application file for complete search history.

(56) References Cited

U.S. PATENT DOCUMENTS

| | | | | |
|---|---|---|---|---|
| 2001/0012113 | A1* | 8/2001 | Yoshizawa et al. | 358/1.9 |
| 2006/0164699 | A1* | 7/2006 | Inoue | 358/515 |
| 2009/0034007 | A1* | 2/2009 | Sano et al. | 358/3.13 |
| 2009/0195835 | A1* | 8/2009 | Kashibuchi et al. | 358/3.01 |
| 2009/0213401 | A1* | 8/2009 | Higashiyama et al. | 358/1.9 |

FOREIGN PATENT DOCUMENTS

| | | |
|---|---|---|
| JP | 11-027552 | 1/1999 |
| JP | 2003-259121 | 9/2003 |
| JP | 2004-120133 A | 4/2004 |
| JP | 2004-135317 A | 4/2004 |
| JP | 2011-082880 | 4/2011 |

OTHER PUBLICATIONS

Japanese Office Action, Notification of Reasons for Refusal. Patent Application No. 2012-102293. Mailing Date: Jul. 22, 2014 (2 pages).
English translation of Japanese Office Action, Notification of Reasons for Refusal. Patent Application No. 2012-102293. Mailing Date: Jul. 22, 2014 (4 pages).

* cited by examiner

*Primary Examiner* — Long D Pham
(74) *Attorney, Agent, or Firm* — Lucas & Mercanti, LLP

(57) ABSTRACT

An image processing apparatus to perform a screen process on color image data using threshold matrices includes an address calculation section, threshold processor and shift section. The address calculation section calculates an address in the threshold matrix. The threshold processor acquires a threshold by the address, and performs an n-valued process (n≥2) on a pixel value using the threshold. The shift section divides the image data into blocks in units of the threshold matrix, determines shift amounts for each block, and shifts the address. The threshold processor acquires a threshold by an address after the shift for at least one color, and performs the n-valued process using the threshold. The threshold matrix for a color for which the address is shifted has a screen ruling with a lower number of lines than the address is not shifted.

6 Claims, 7 Drawing Sheets

FIG.2A

|  | sai |  |  |  |
|---|---|---|---|---|
|  | 1 | 2 | 3 | 4 |
| 1 | Th11 | Th21 | Th31 | Th41 |
| saj 2 | Th12 | Th22 | Th32 | Th42 |
| 3 | Th13 | Th23 | Th33 | Th43 |
| 4 | Th14 | Th24 | Th34 | Th44 |

IMAGE PROCESSING APPARATUS AND IMAGE PROCESSING METHOD TO PERFORM SCREEN PROCESS ON IMAGE DATA OF A PLURALITY OF COLORS USING THRESHOLD MATRIX FOR EACH COLOR

BACKGROUND OF THE INVENTION

1. Field of the Invention

The present invention relates to an image processing apparatus and an image processing method which performs a screen process on image data of a plurality of colors using a threshold matrix for each color.

2. Description of Related Art

As a method for reproducing a medium tone of an image, frequency modulation (FM) screening and amplitude modulation (AM) screening have conventionally been known. FM screening expresses a shade by the density of dots, each dot having the same size. On the other hand, AM screening forms halftone dots, each consisting of a group of dots, at regular intervals. AM screening expresses a shade by varying the sizes of the halftone dots.

A screen pattern of AM screening has periodicity of halftone dots. For this reason, when screen patterns of a plurality of colors are superimposed with one another to reproduce a color image, moiré tends to arise owing to interference. Therefore, it is common to vary a screen angle depending on the color in order to reduce moiré.

As another method to reduce moiré, Japanese Patent Application Laid-Open No. 2004-135317 proposes to use FM screening for at least one of a plurality of colors to reduce the number of colors for which AM screening is used.

A screen pattern formed with FM screening has high resolution and the dots thereof are positioned at random, in general, which tends to cause dot gain and leads to low stability of density.

Such a combined use of FM screening and AM screening for reproducing color images causes a decrease in the stability of density of a color for which FM screening is used, among the colors. This may lead to reduction in image quality of the entire color image. Therefore, there has been a demand for a more effective way of reducing moiré.

SUMMARY OF THE INVENTION

The present invention provides an image processing apparatus and an image processing method to reduce moiré.

According to one aspect of a preferred embodiment of the present invention, there is provided an image processing apparatus which performs a screen process on image data of a plurality of colors using a threshold matrix for each of the colors, the apparatus including: an address calculation section which calculates an address in the threshold matrix based on a position of a pixel in the image data for each pixel; a threshold processor which acquires, from the threshold matrix, a threshold corresponding to the address, and performs an n-valued process (n≥2) on a pixel value of the pixel using the acquired threshold for each pixel; a shift section which divides the image data into blocks in units of the threshold matrix, determines a shift amount in a main scanning direction and a shift amount in a sub-scanning direction for each of the blocks, and shifts the address by the shift amounts, wherein the threshold processor acquires a threshold corresponding to an address after the shift by the shift section for the image data of at least one of the colors, and performs the n-valued process using the acquired threshold; and wherein the threshold matrix for a color for which the address is shifted has a screen ruling with a lower number of lines than the threshold matrix for a color for which the address is not shifted.

According to another aspect of a preferred embodiment of the present invention, there is provided an image processing method which performs a screen process on image data of a plurality of colors using a threshold matrix for each of the colors, the method including: (a) calculating an address in the threshold matrix based on a position of a pixel in the image data for each pixel; (b) acquiring, from the threshold matrix, a threshold corresponding to the address, and performing an n-valued process (n≥2) on a pixel value of the pixel using the acquired threshold for each pixel; (c) dividing the image data into blocks in units of the threshold matrix, determining a shift amount in a main scanning direction and a shift amount in a sub-scanning direction for each of the blocks, and shifting the address by the shift amounts, wherein step (b) acquires a threshold corresponding to an address after the shift by step (c) for the image data of at least one of the colors, and performs the n-valued process using the acquired threshold; and wherein the threshold matrix for a color for which the address is shifted has a screen ruling with a lower number of lines than the threshold matrix for a color for which the address is not shifted.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2A shows a threshold matrix;

FIG. 3 shows thresholds used for pixels when the addresses of thresholds are not shifted.

FIG. 5 shows thresholds used for pixels when the addresses of thresholds are shifted.

DESCRIPTION OF THE PREFERRED EMBODIMENT

An embodiment of an image processing apparatus and an image processing method according to the present invention will now be described with reference to the accompanying drawings.

Figure 1:
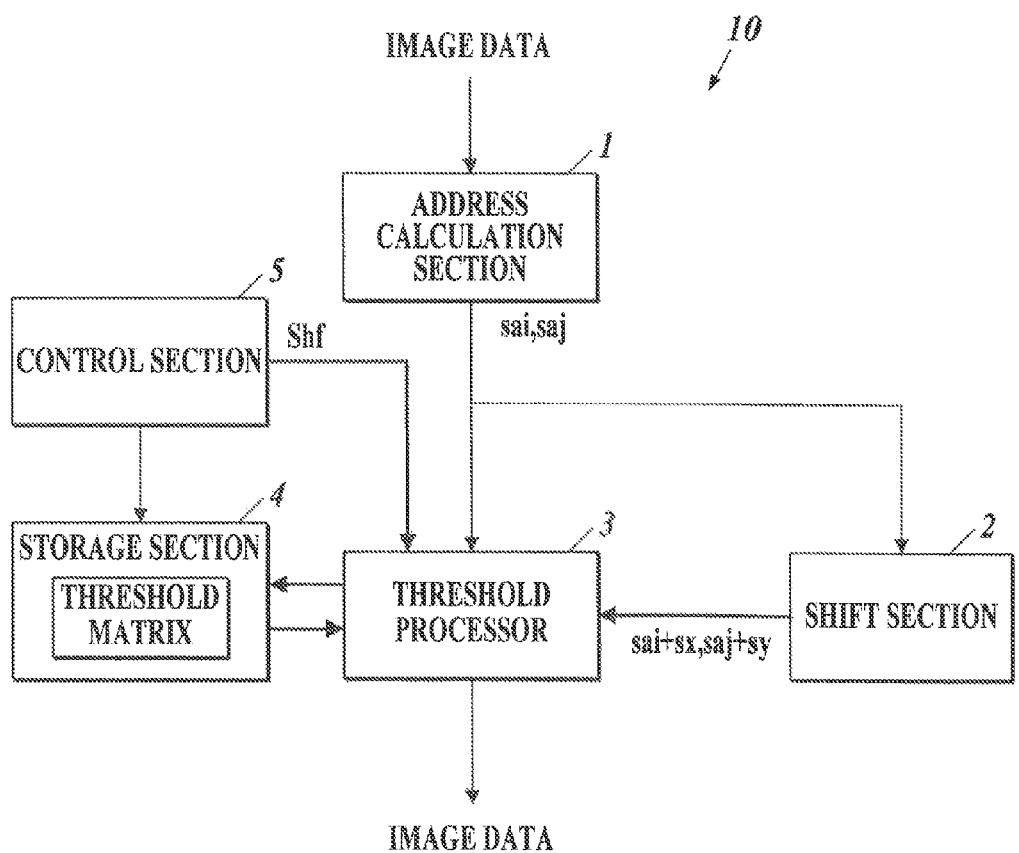
FIG. 1 shows an image processing apparatus in accordance with the present embodiment.

FIG. 1 shows an image processing apparatus 10 in accordance with the present embodiment.

The image processing apparatus 10 inputs color image data composed of image data of four colors of C (cyan), M (magenta), Y (yellow) and K (black); and performs a screen process on the image data of each color using a threshold matrix for a corresponding color. The image processing apparatus 10 may be mounted on an image forming apparatus such as a copier and a printer, a print controller, or the like.

Figure 2A:
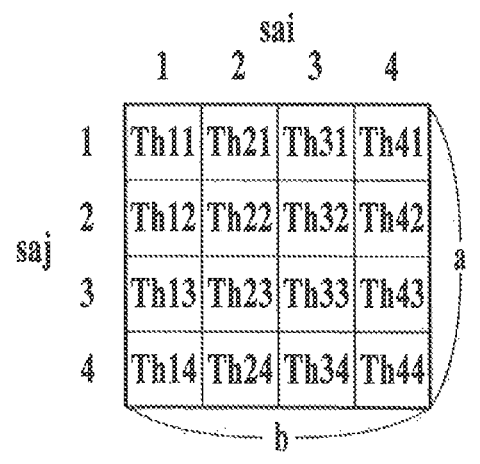

FIG. 2A shows an example of a threshold matrix.

The threshold matrix has (a×b) pixels each having an address which indicates a position in the threshold matrix. An address is a positional coordinate (sai, saj) in a main scanning direction and a sub-scanning direction. Thresholds Th11-

Th44 are set for the addresses, with the thresholds and the addresses being associated with each other, respectively. The thresholds Th11-Th44 are designed for AM screening, and are set so as to form halftone dots each consisting of a group of dots.

The threshold matrix is prepared for each color. The size (a, b) and settings for the thresholds Th11-Th44 vary depending on the color, such that the screen angle and the screen ruling of a screen pattern formed by a threshold matrix vary depending on the color.

As shown in FIG. 1, the image processing apparatus 10 includes an address calculation section 1, a shift section 2, a threshold processor 3, a storage section 4 and a control section 5.

Figure 2B:
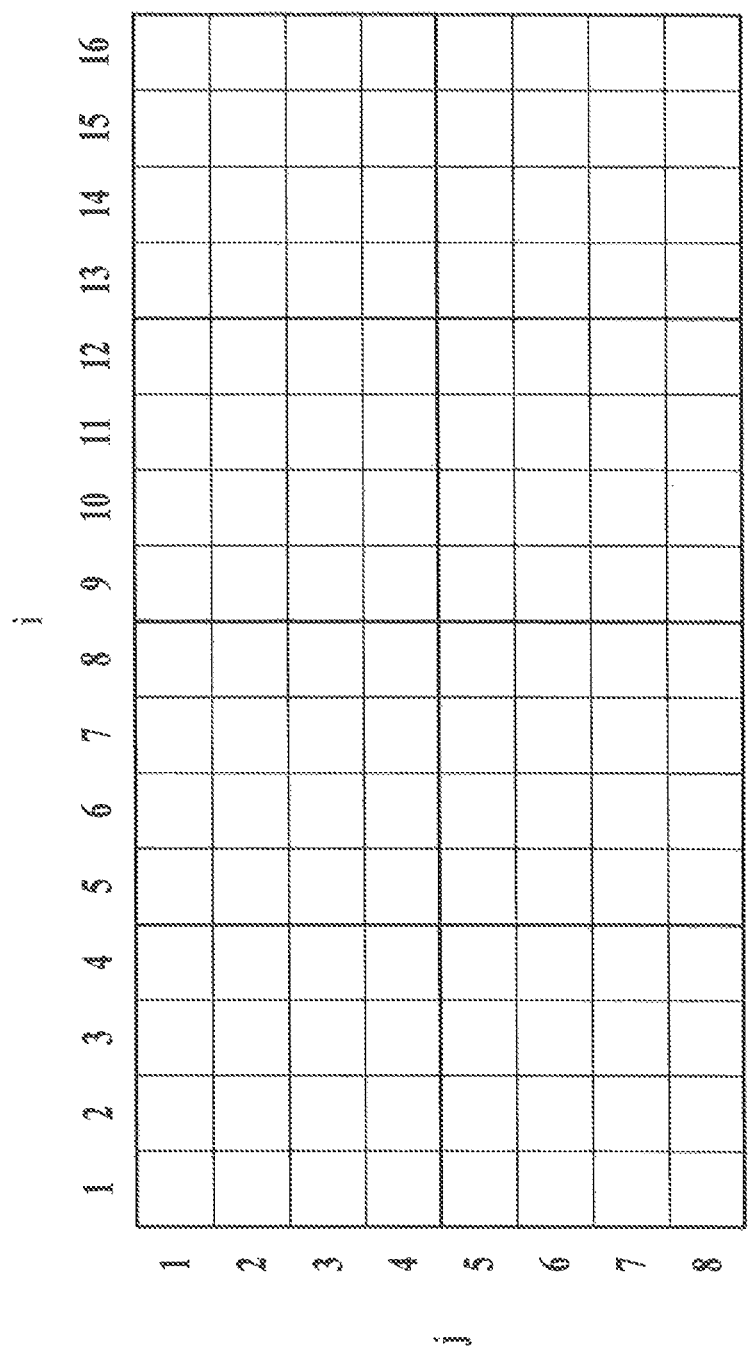
FIG. 2B shows the positional coordinates of image data.

The address calculation section 1 inputs image data on a pixel basis, and calculates an address (sai, saj) in a threshold matrix based on the position of a pixel in the image data for each pixel. When the position of each pixel in the image data is indicated by a positional coordinate (i, j) in the main scanning and sub-scanning directions, as shown in FIG. 2B, an address (sai, saj) is calculated with the following expressions.

$$sai = i \% a$$

$$saj = j \% b$$

The symbol of "%" is an operator representing a residue calculation. As stated above, since the size (a, b) of a threshold matrix varies depending on the color, the address calculation section 1 uses a size (a, b) corresponding to the color of image data.

The address calculation section 1 outputs a calculated address (sai, saj) to the threshold processor 3 and the shift section 2.

The shift section 2 divides image data into blocks in units of threshold matrices, and determines a shift amount (sx) in the main scanning direction and a shift amount (sy) in the sub-scanning direction for each block. One block is composed of (a×b) pixels. The shift section 2 determines shift amounts for the main scanning and sub-scanning directions for each block independently.

The shift section 2 may include a random number generator, for example, to generate random numbers for the main scanning and sub-scanning directions, respectively, for each block. The random numbers may be determined to be shift amounts sx and sy, respectively. Alternatively, the shift section 2 may include a table in which shift amounts sx and sy are set in advance, the shift amounts being different from block to block. The shift amounts sx and sy of the block in which a pixel is positioned may be acquired from the table for each pixel. The table may be defined such that the shifts create a specific frequency pattern such as a blue noise and green noise.

The shift section 2 shifts an address (sai, saj) by the shift amounts sx and sy, and outputs the address (sai+sx, saj+sy) after the shift to the threshold processor 3.

When (sai+sx)>b or (saj+sy)>a holds as a result of addition of shift amounts sx and sy, the shift section 2 subtracts "b" or "a" and determines (sai+sx−b) or (saj+sy−a) to be the address after the shift.

The threshold processor 3 acquires, from the threshold matrix stored in the storage section 4, a threshold corresponding to the address (sai, saj) inputted from the address calculation section 1. The threshold processor 3 performs an n-valued process (n≥2) on the pixel value of a pixel using the corresponding threshold for each pixel.

In the case where the threshold processor 3 performs a two-valued process on a pixel value of eight bits, which ranges from 0 to 255, for example, the threshold processor 3 outputs a pixel value of 0 if a pixel value is less than a threshold, and outputs a pixel value of 255 if a pixel value is equal to or larger than the threshold. In the case of an n-valued process (n>2) instead of two-valued process, the threshold processor 3 sets an acquired threshold to be a first threshold, and adds a predetermined value to the first threshold to acquire a second threshold. The threshold processor 3 outputs a pixel value of 0 if a pixel value is less than the first threshold; outputs a pixel value of 255 if a pixel value is equal to or larger than the second threshold; and obtains a pixel value of a medium tone by a linear interpolation equation with the first and second thresholds and outputs the obtained pixel value if a pixel value is equal to or lager than the first threshold and less than the second threshold.

The threshold processor 3 acquires a threshold corresponding to an address (sai+sx, saj+sy) after a shift by the shift section 2 for image data of at least one of a plurality of colors, and performs the n-valued process using the threshold.

Specifically, the threshold processor 3 acquires a threshold corresponding to an address (sai+sx, saj+sy) inputted from the shift section 2 when a shift signal Shf is inputted from the control section 5. When there is no input of the shift signal Shf from the control section 5, the threshold processor 3 acquires a threshold corresponding to an address (sai, saj) inputted from the address calculation section 1.

The color for which an address of threshold is shifted preferably has a lower visual sensitivity among a plurality of colors. Since Y has the lowest visual sensitivity among the four colors of C, M, Y and K, for example, it is preferable that, at the time of a screen process on image data of at least Y color, the threshold processor 3 acquire a threshold corresponding to an address (sai+sx, saj+sy) after a shift.

The continuity of a screen pattern formed by a threshold matrix is broken at block boundaries owing to shifts of the addresses of thresholds. A color having a lower visual sensitivity, however, prevents the discontinuities from being conspicuous, which can prevent deterioration in visual image quality.

A threshold matrix for a color for which an address of threshold is shifted has a screen ruling with a lower number of lines than a threshold matrix for a color for which an address of threshold is not shifted. The continuity of a screen pattern formed by a threshold matrix is broken at block boundaries owing to shifts of the addresses of thresholds. Therefore, a screen pattern has a higher resolution when addresses are shifted than when they are not shifted. The screen ruling with a lower number of lines, however, can retain continuity in dots to some extent even when the discontinuity of a screen pattern occurs. This reduces the influence of increase in resolution, and prevents reduction in stability of density owing to the increase in resolution.

The storage section 4 stores a threshold matrix for a target color for which the screen process is performed among threshold matrices for a plurality of colors. Specifically, the storage section 4 stores the thresholds of the threshold matrix with the thresholds being associated with the respective addresses.

Each time the screen process for one color is completed, the control section 5 rewrites a threshold matrix stored in the storage section 4 into a threshold matrix for a next target color.

When the color of image data on which the screen process is performed is the color for which an address of threshold is shifted, the control section 5 outputs the shift signal Shf to the threshold processor 3 until the screen process is completed for all the pixels.

When the color of image data on which the screen process is performed is not the color for which an address of threshold is shifted, the control section 5 stops the output of the shift signal Shf.

Next, the flow of the screen process performed by the image processing apparatus 10 is described.

When the addresses of thresholds are shifted for image data of only Y color, which has the lowest visual sensitivity among the four colors of C, M, Y and K, the image processing apparatus 10 executes the screen process on the image data of C, M and K colors as follows.

[In the Case of Addresses without Shifts]

First, the control section 5 stops outputting the shift signal Shf. The control section 5 rewrites the threshold matrix stored in the storage section 4 into a threshold matrix for C color.

The address calculation section 1 inputs one pixel of image data of C color, and calculates an address (sai, saj) in the threshold matrix for C color based on the positional coordinate (i, j) of the inputted pixel of interest. Since no shift signal Shf is inputted from the control section 5, the threshold processor 3 acquires the threshold corresponding to the address (sai, saj) from the threshold matrix for C color stored in the storage section 4. The threshold processor 3 performs the n-valued process on the pixel value of the pixel of interest using the acquired threshold, and outputs the result.

The image processing apparatus 10 performs the above-described process on all the pixels, and thus the image data of C color on which the screen process has been performed can be acquired.

The image processing apparatus 10 performs the screen process on the image data of M and K colors, too, in the same manner as the screen process for the C color.

Figure 3:
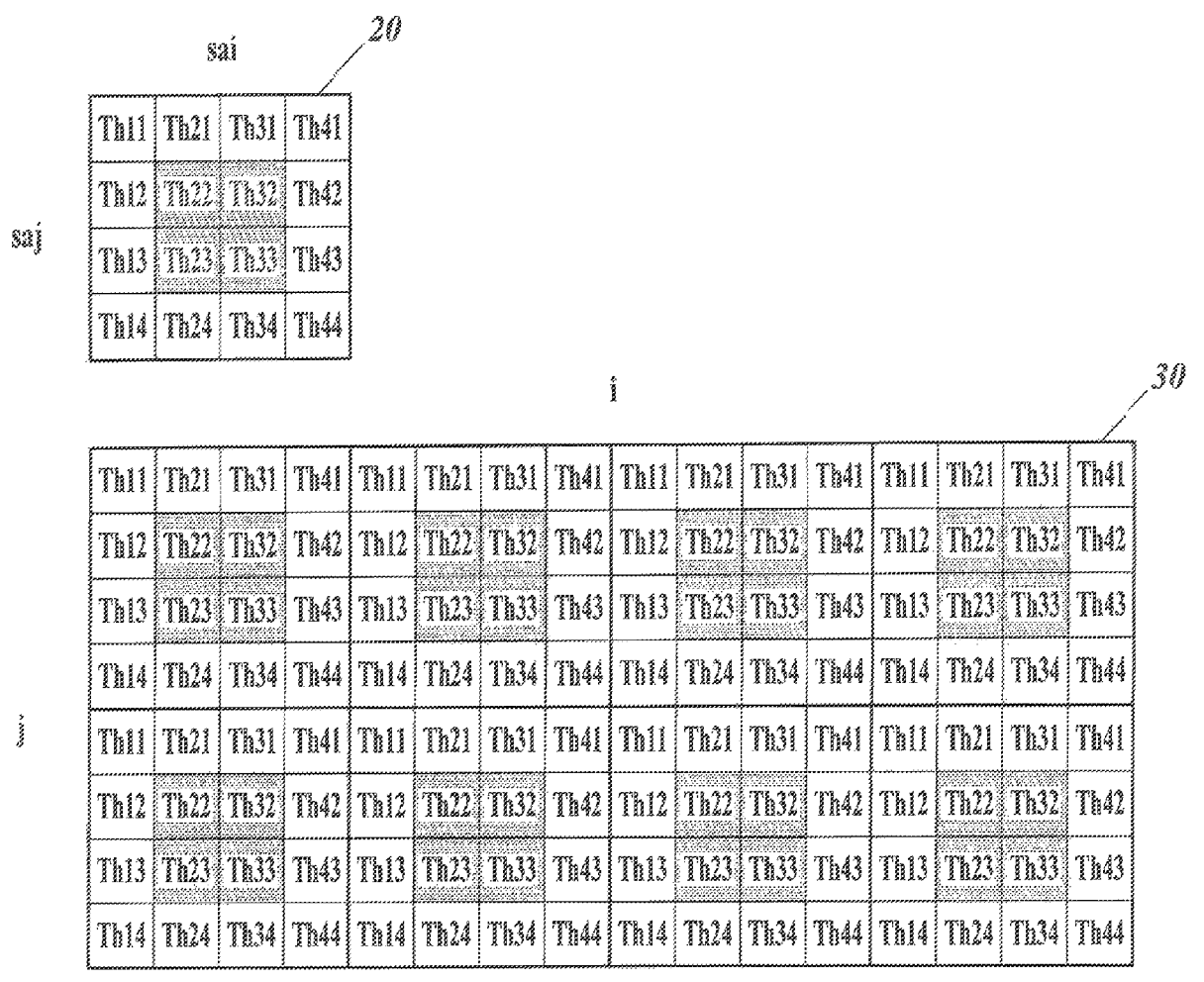

FIG. 3 shows thresholds Th11-Th44 used for the pixels of image data 30 as the result of the above-described screen process. As shown in FIG. 3, since the addresses of thresholds are not shifted, the thresholds used for the pixels are disposed in the same manner as a threshold matrix 20 in units of (a×b) pixels. When the entire pixels have a pixel value of 25% and when the pixels for which thresholds Th22, Th23, Th32 and Th33 are used are dotted, a screen pattern as shown in FIG. 3 is formed where halftone dots each consisting of four dots are periodically arranged.

[In the Case of Addresses with Shifts]

The image processing apparatus 10 executes the screen process on the image data of Y color as follows.

First, the control section 5 outputs the shift signal Shf. The control section 5 rewrites the threshold matrix stored in the storage section 4 into a threshold matrix for Y color.

The address calculation section 1 inputs one pixel of the image data of Y color, and calculates the address (sai, saj) in the threshold matrix for Y color based on the positional coordinate (i, j) of the inputted pixel of interest. The shift section 2 divides image data into blocks in units of threshold matrices for Y color, and determines shift amounts (sx and sy) in the main scanning and sub-scanning directions for each block.

Figure 4:
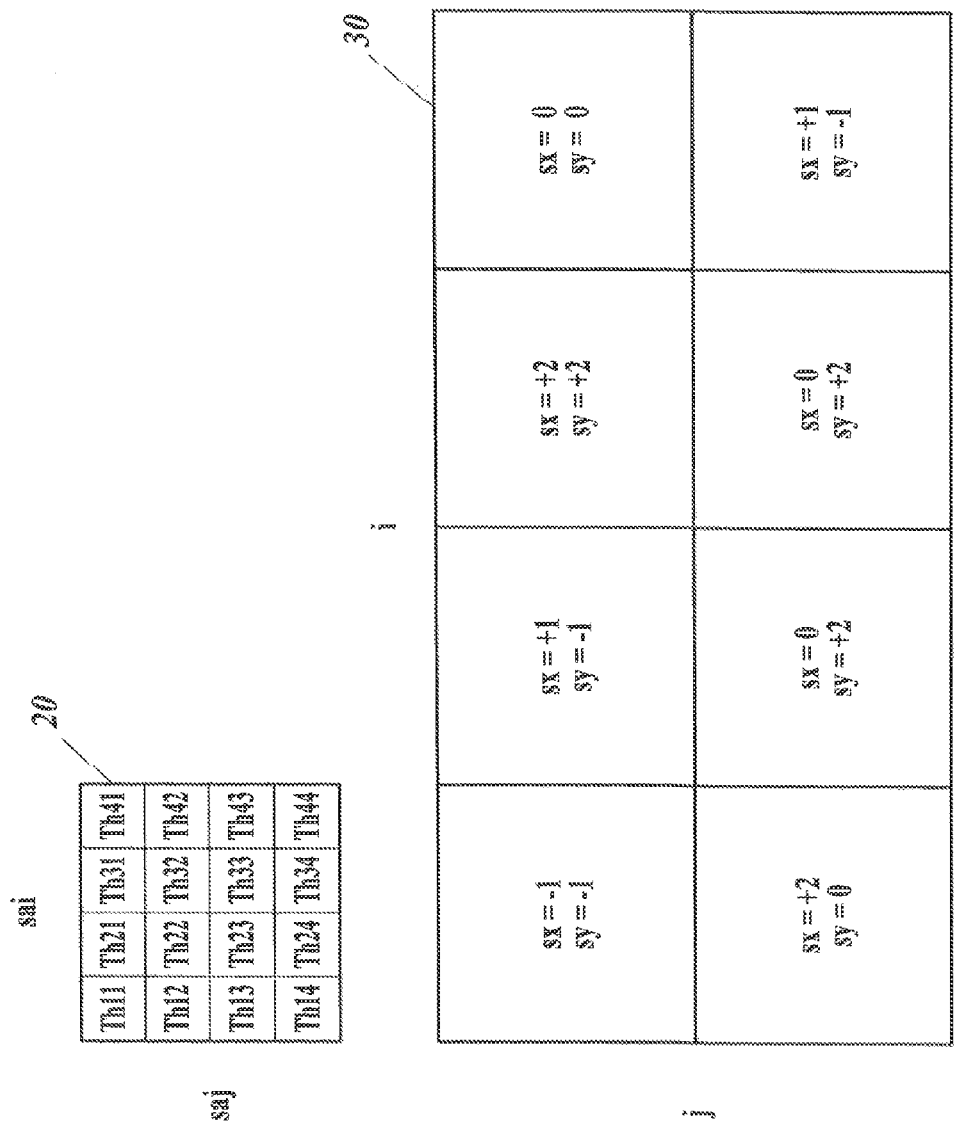
FIG. 4 shows image data which is divided into blocks, and shows shift amounts determined for each block.

FIG. 4 shows image data 30 which is divided into blocks in units of (a×b) pixels, each unit being identical to the threshold matrix 20. As shown in FIG. 4, shift amounts sx and sy are determined independently for each block.

The shift section 2 shifts an address (sai, saj) by the shift amounts sx and sy, and outputs the result to the threshold processor 3.

The threshold processor 3 acquires, from the threshold matrix for Y color, the threshold corresponding to the address (sai+sx, saj+sy) after the shift in response to the input of the shift signal Shf from the control section 5. The threshold processor 3 performs the n-valued process on the pixel value of the pixel of interest using the acquired threshold, and outputs the result.

The image processing apparatus 10 performs the above-described process on all the pixels, and thus the image data of Y color on which the screen process has been performed can be acquired.

Figure 5:
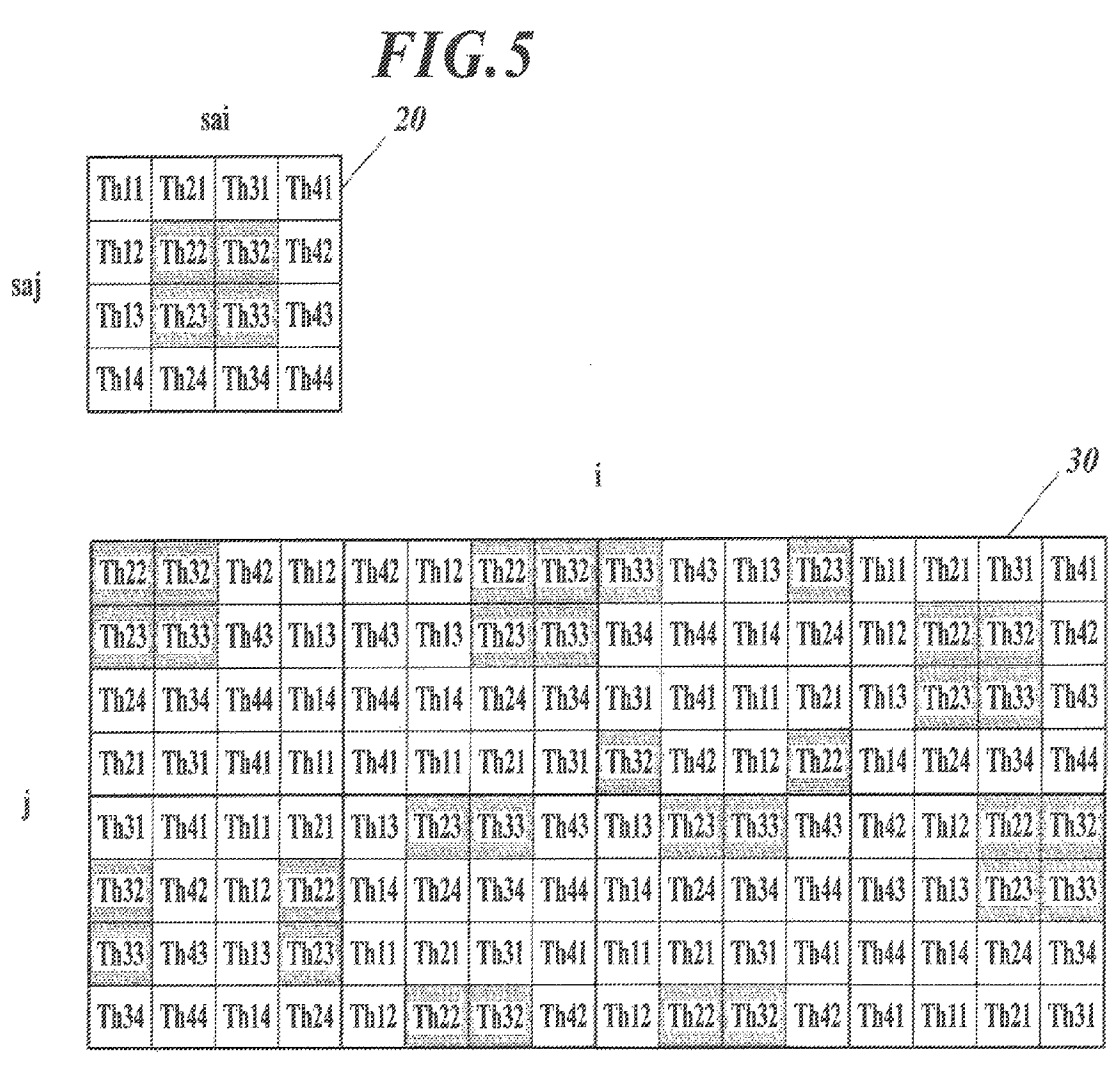

FIG. 5 shows thresholds Th11-Th44 used for the pixels of the image data 30 as the result of the above-described screen process. As shown in FIG. 5, since the addresses of thresholds are shifted, the disposition of the thresholds in one block is different from that of the threshold matrix 20. Further, the disposition of the thresholds differs from block to block. When the entire pixels have a pixel value of 25% and when the pixels for which thresholds Th22, Th23, Th32 and Th33 are used are dotted, a screen pattern as shown in FIG. 5 is formed where the dots constituting each halftone dot are disposed in different positions depending on blocks or where the positions of halftone dots are irregularly arranged.

Figure 6:
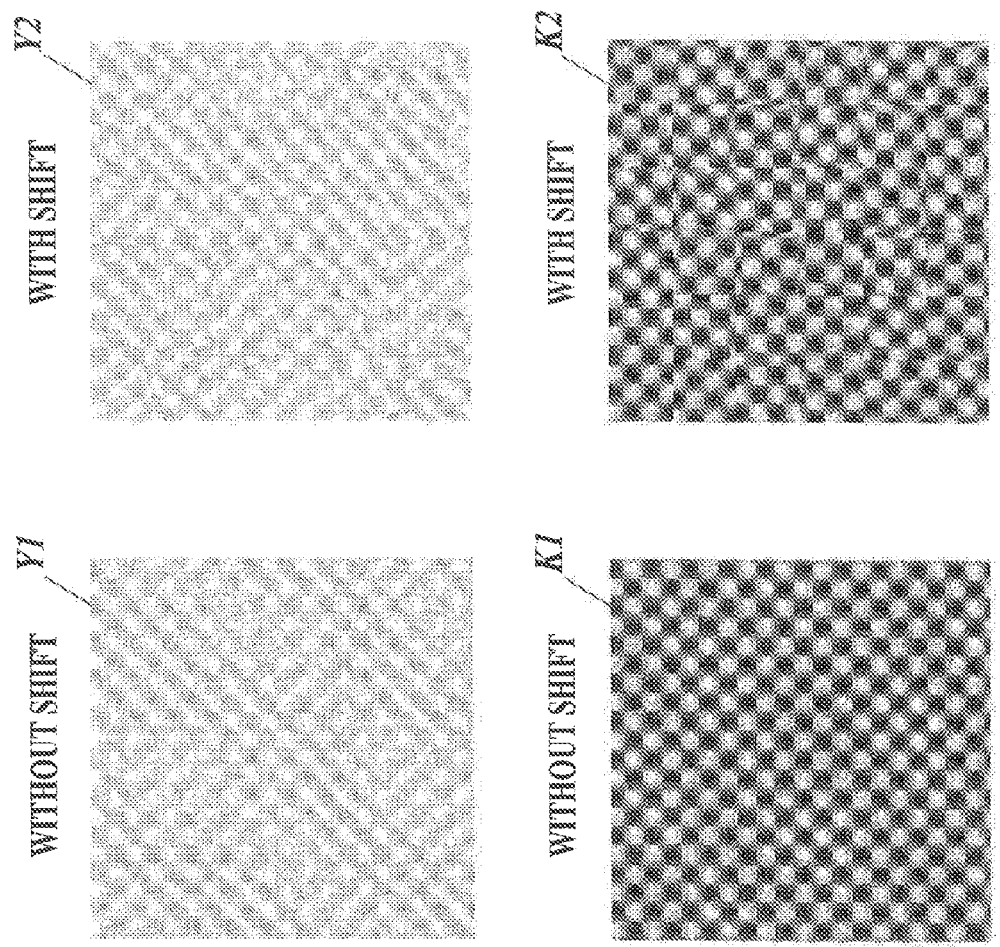
FIG. 6 shows screen patterns acquired when the addresses of thresholds are shifted and not shifted.
Figure 6:
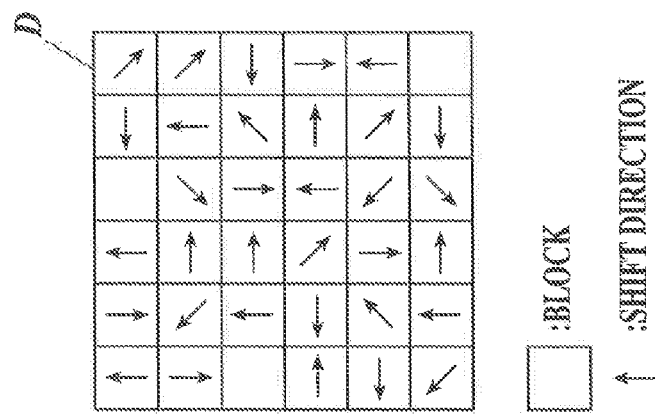

FIG. 6 shows screen patterns acquired when the addresses of thresholds are shifted and not shifted.

When the screen process was preformed on image data of Y color without shifting the addresses of thresholds, a screen pattern Y1 was acquired where halftone dots are periodically arranged. On the other hand, when the addresses were shifted as shown in the table D, a screen pattern Y2 was acquired. In the screen pattern Y2, the positions of halftone dots are different from block to block and periodicity is partially broken. The table D shows image data in units of blocks and shift directions for the respective blocks. A block without an arrow indicates a shift amount of zero, i.e., no shift.

In a similar manner, when the screen process was preformed on image data of K color without shifting the addresses of thresholds, a screen pattern K1 was acquired; and when the addresses were shifted, a screen pattern K2 was acquired.

It is found that discontinuities between blocks at block boundaries owing to the shift in the screen pattern Y2 are less conspicuous than those in the screen pattern K2 since Y color has a lower visual sensitivity than K color.

As described above, according to the present embodiment, the image processing apparatus 10, which performs the screen process on image data of a plurality of colors using a threshold matrix for each of the colors, includes the address calculation section 1, the threshold processor 3 and the shift section 2. The address calculation section 1 calculates an address in the threshold matrix based on the position of a pixel in the image data for each pixel. The threshold processor 3 acquires, from the threshold matrix, a threshold corresponding to the address, and performs the n-valued process (n≥2) on the pixel value using the threshold for each pixel. The shift section 2 divides the image data into blocks in units of the threshold matrix, determines a shift amount in the main scanning direction and a shift amount in the sub-scanning direction for each block, and shifts the addresses by the shift amounts. The threshold processor 3 acquires a threshold corresponding to an address after the shift by the shift section 2 for image data of at least one of the colors, and performs the n-valued process using the threshold. A threshold matrix for a color for which an address of threshold is shifted has a screen ruling with a lower number of lines than a threshold matrix for a color for which an address of threshold is not shifted.

This can break periodicity of halftone dots in a screen pattern for at least one color, which reduces moiré caused by superimposition of screen patterns of a plurality of colors.

Further, since a threshold matrix for AM screening is used for each color in the present embodiment, a screen pattern having a lower resolution can be formed than in the case where a threshold matrix for FM screening is used. This improves stability of density.

In the present embodiment, the threshold matrices have different screen angles depending on the colors. However, the screen angle of a color for which an address of threshold is shifted and that of a color for which an address of threshold is not shifted may be made close to each other. Such a configuration can also reduce moiré. This broadens the range of screen angles to be chosen and increases the flexibility in design of threshold matrices.

The above-described embodiment is one example of preferred embodiments, and the present invention is not limited thereto. Various modifications may be made as appropriate without departing from the scope of the present invention.

For example, the shifts of the addresses of thresholds may be applied to a threshold matrix for FM screening. In the case of FM screening, a unique pattern is formed when dots are adjacent to one another at a gradation value of about 50%. Shifting of thresholds can shift the dots and thus can make an irregular pattern.

In the above-described embodiment, a threshold matrix for AM screening is used for each of the colors. Alternatively, a threshold matrix for AM screening and that for FM screening may be combined. For example, addresses may be shifted using a threshold matrix for AM screening for one of a plurality of colors, and a threshold matrix for FM screening may be used for another color. Alternatively, addresses may be shifted using a threshold matrix for FM screening for one of a plurality of colors.

Further, the screen process performed by the image processing apparatus 10 may be programmed, and the screen process may be realized by reading and executing the program with a computer. A computer readable medium having stored thereon the program may be a non-volatile memory such as a read-only memory (ROM) and a flash memory or a portable storage medium such as a compact disc read only memory (CD-ROM). Additionally a carrier wave may also be applied as a medium to provide the data of the program via a communication line.

The entire disclosure of Japanese Patent Application No. 2012-102293 filed on Apr. 27, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus which performs a screen process on image data of a plurality of colors using a threshold matrix for each of the colors, the apparatus comprising:
   an address calculation section which calculates a first address in the threshold matrix based on a position of a pixel in the image data for each pixel;
   a threshold processor which acquires, from the threshold matrix, a threshold corresponding to the first address, and performs an n-valued process (n≥2) on a pixel value of the pixel using the acquired threshold for each pixel;
   a shift section which divides the image data into blocks in units of the threshold matrix, determines a shift amount in a main scanning direction and a shift amount in a sub-scanning direction for each of the blocks, and shifts the first address by the shift amounts to form a second address,
   wherein the threshold processor acquires a threshold corresponding to the second address after the shift by the shift section for the image data of at least one of the colors, and performs the n-valued process using the acquired threshold; and
   wherein the threshold matrix for a color for the second address has a screen ruling with a lower number of lines than the threshold matrix for a color for which the first address.

2. The image processing apparatus according to claim 1, wherein the color for which the second address has a lower visual sensitivity among the colors.

3. The image processing apparatus according to claim 1, wherein the threshold matrix for each of the colors is a threshold matrix for amplitude modulation (AM) screening.

4. An image processing method which performs a screen process on image data of a plurality of colors using a threshold matrix for each of the colors, the method comprising:
   (a) calculating a first address in the threshold matrix based on a position of a pixel in the image data for each pixel;
   (b) acquiring, from the threshold matrix, a threshold corresponding to the first address, and performing an n-valued process (n≥2) on a pixel value of the pixel using the acquired threshold for each pixel;
   (c) dividing the image data into blocks in units of the threshold matrix, determining a shift amount in a main scanning direction and a shift amount in a sub-scanning direction for each of the blocks, and shifting the first address by the shift amounts to form a second address,
   wherein step (b) acquires a threshold corresponding to the second address after the shift by step (c) for the image data of at least one of the colors, and performs the n-valued process using the acquired threshold; and
   wherein the threshold matrix for a color for which the second address has a screen ruling with a lower number of lines than the threshold matrix for a color for which the first address.

5. The image processing method according to claim 4, wherein the color for which the second address has a lower visual sensitivity among the colors.

6. The image processing method according to claim 4, wherein the threshold matrix for each of the colors is a threshold matrix for amplitude modulation (AM) screening.

* * * * *